United States Patent
Miller et al.

[19]

[11] Patent Number: 6,056,881
[45] Date of Patent: May 2, 2000

[54] BILGE WATER CLEANING DEVICE

[76] Inventors: Edward M. Miller, 6850 W. 300 North, Johnson County, Bargersville, Ind. 46106; Kurt L. Miller, 6605 E. Ave., Cook County, Hodgkins, Ill. 60525

[21] Appl. No.: 08/942,529

[22] Filed: Oct. 2, 1997

Related U.S. Application Data

[60] Provisional application No. 60/027,313, Oct. 3, 1996.

[51] Int. Cl.⁷ .............................. C02F 1/52; B01D 29/25; B01D 29/27
[52] U.S. Cl. ..................... 210/702; 210/133; 210/232; 210/433.1; 210/448; 210/485; 210/799
[58] Field of Search ................................. 210/96.1, 109, 210/143, 232, 242.4, 416.1, 433.1, 448, 502.1, 799, 924, DIG. 5, 418, 483, 485, 488, 497.01, 505, 767, 90, 130, 133, 424, 444, 456, 702

[56] References Cited

U.S. PATENT DOCUMENTS

| | | | |
|---|---|---|---|
| 3,253,711 | 5/1966 | Young | 210/96.1 |
| 4,031,839 | 6/1977 | Pedone | 210/924 |
| 4,058,463 | 11/1977 | Bartik | 210/497.01 |
| 5,350,527 | 9/1994 | Kitko | 210/109 |
| 5,609,760 | 3/1997 | Leach | 210/448 |
| 5,705,065 | 1/1998 | Sharpe | 210/448 |

*Primary Examiner*—Joseph W. Drodge
*Attorney, Agent, or Firm*—Gary M. Hartman; Domenica N. S. Hartman

[57] ABSTRACT

A bilge water filtration system for removing petroleum-based liquid contaminants from the bilge water as it is being pumped from the bilge to a bilge water discharge outlet in the hull of a marine vessel, such as a boat or yacht. The filtration system employs filtration media enclosed in a modular unit equipped with a fill tube, such that media can be readily installed in the system, and then later removed to allow for subsequent destruction or recycling of the contaminants trapped by the media. The filtration system of this invention is adapted to be installed in-line with an existing bilge pumping system on boats and yachts of practically any size, and without requiring special modifications to the pumping system. In addition, the filtration system does not impede the operation of the bilge pumping system, but allows the flow bilge water to flow from the boat's bilge at conventional flow rates and with a minimal pressure drop caused by the filtration system.

19 Claims, 1 Drawing Sheet

BILGE WATER CLEANING DEVICE

CROSS REFERENCE TO RELATED APPLICATIONS

This application claims the benefit of U.S. Provisional Application No. 60/027,313, filed Oct. 3, 1996.

BACKGROUND OF THE INVENTION

1. Field of the Invention

The present invention generally relates to bilge water pumping systems for a marine vessel, such as a boat or yacht. More particularly, this invention relates to a bilge water filtration system for removing petroleum-based liquid contaminants from the bilge water as it is being pumped from the bilge to a discharge outlet in the hull of the marine vessel.

2. Description of the Prior Art

The restoration and maintenance of the chemical, physical and biological integrity of rivers, streams, lakes and oceans are increasingly receiving greater attention. In response, legislation such as the U.S. Federal Water Pollution Control Act (FWPCA), often referred to as the "Clean Water Act," has been passed to direct and regulate procedures and standards for restoring and maintaining the chemical, physical and biological integrity of waters in the United States of America. One such standard entails the regulation of the discharge of oil and other hazardous substances into U.S. waters. Boaters and marine maintenance services are subject to such regulations due to the potential for the discharge of hazardous substances from boats, and particularly contaminants contained in the bilge water that must be periodically pumped from the bilge of a boat. Bilge water can be fouled by a wide variety of contaminants, including motor oils, transmission, power steering and hydraulic trim fluids, fuel from the engine (gas or diesel), and solvents and paints used during repair and cleaning. Currently, in-line filter systems capable of automatically cleaning bilge water prior to its discharge overboard are extremely complicated, cost prohibitive, or not widely accepted by the industry.

SUMMARY OF THE INVENTION

In accordance with this invention, a bilge water filtration system is provided that removes petroleum-based liquid contaminants from the bilge water as it is being pumped from the bilge to a bilge water discharge outlet conventionally provided in the hull of a marine vessel, such as a boat or yacht. The filtration system employs filtration media enclosed in a modular unit equipped with a fill tube, such that media can be readily installed in the system, and then later removed to allow for subsequent destruction or recycling of the contaminants trapped by the media. The filtration system of this invention is adapted to be installed in-line with an existing bilge pumping system on boats and yachts of practically any size, and without requiring special modifications to the pumping system. In addition, the filtration system does not impede the operation of the bilge pumping system, but allows the flow bilge water to flow from the boat's bilge at conventional flow rates and with a minimal pressure drop caused by the filtration system.

Other objects and advantages of this invention will be better appreciated from the following detailed description.

BRIEF DESCRIPTION OF THE DRAWINGS

The above and other advantageous of this invention will become more apparent from the following description taken in conjunction with the accompanying drawings, in which.

DETAILED DESCRIPTION OF THE INVENTION

Figure 1:
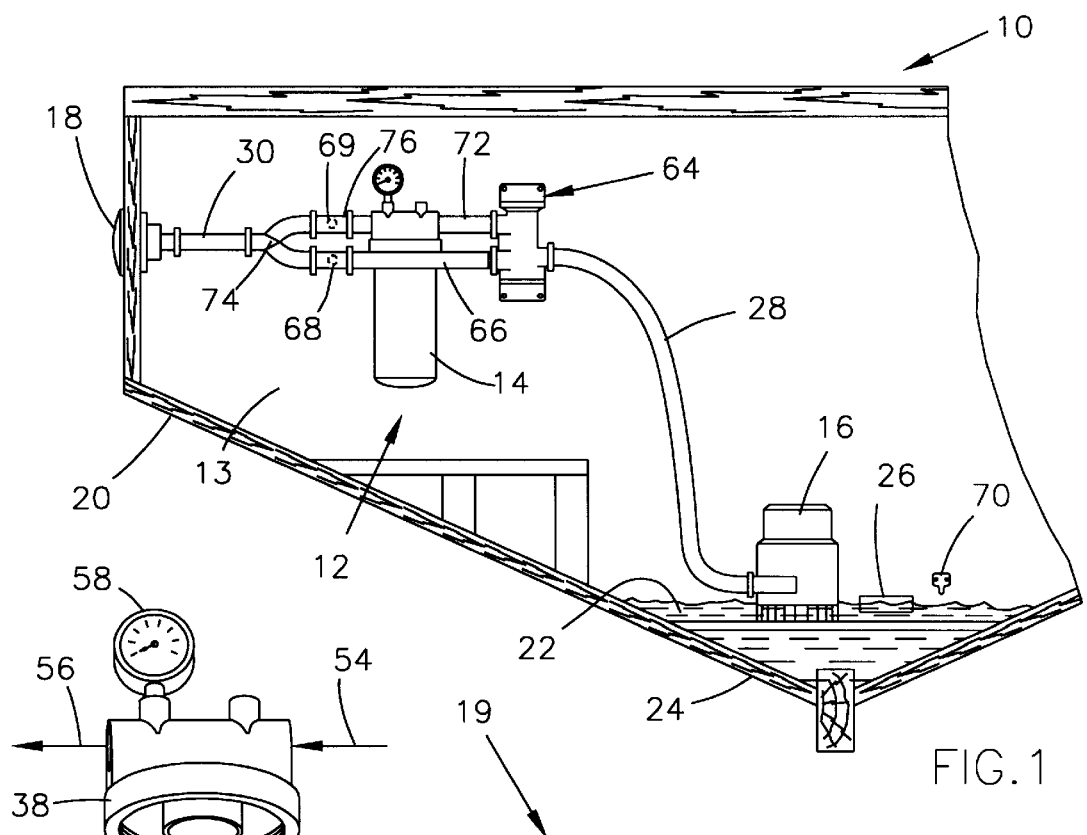
FIG. 1 is a cross-sectional view of a boat equipped with a bilge water filtration system of this invention.

Shown in FIG. 1 is a boat 10 equipped with a bilge water filtration system 12 in accordance with this invention. The filtration system 12 includes a filtration unit 14 installed between the boat's bilge pump 16 and a discharge outlet 18 in the boat hull 20. The filtration unit 14 is preferably mounted with a bracket 19 shown in FIG. 3. The mounting bracket 19 provides a strong support of the filtration unit 14 and is preferably resistant to corrosion, with suitable materials being powder-coated carbon steels, stainless steels and composite materials. The bracket 19 is fastened, preferably with bolts, to the transom 13 or another strong structure of the boat 13. The filtration unit 14 includes a fixed head mounting 38 (FIG. 2) that is preferably secured to the bracket 19 with four bolts, while the lower end of the filtration unit 14, formed by a vessel 32 (FIG. 2), is secured to the bracket 19 with a draw-latch band 15 that enables the vessel 32 to be readily installed and removed while the head mounting 38 remains fastened to the bracket 19.

As shown in FIG. 1, the filtration system 12 employs a single filtration unit 14, though multiple units 14 could be used. As is conventional, the bilge pump 16 pumps bilge water 22 from the bilge 24 of the boat 10, and is shown as being operated by a switch 26 that senses the level of bilge water 22 to enable automatic operation of the pump 16. The filtration unit 14 is fluidically connected to the bilge pump 16 with a first segment of hose 28, and fluidically connected to the discharge outlet 18 with a second segment of hose 30.

Also shown in FIG. 1 is an optional bypass system that includes a three-way solenoid-operated bypass valve 64 connected in-line with the hose 28. A bypass hose 66 equipped with a check valve 68 is connected to the hose 30 with a "Y" connector 74. The check valve 68 prevents contaminated water within the hoses 30 and 66 from backflowing to the bypass valve 64. A sensor 70 capable of sensing oil, gasoline, diesel fuel or other petroleum-based materials in the bilge water 22 is provided to selectively switch the three-way solenoid-operated bypass valve 64 to allow contaminated bilge water 22 to be filtered through the filtration unit 14 when petroleum-based contaminants are detected. The contaminated bilge water 22 passes through a hose 72 between the valve 64 and filtration unit 14 and, after being filtered, continues through a hose 76 to the "Y" connector 74, after which the bilge water 22 continues through the hose 30 then overboard through the outlet 18. As with the check valve 68, a check valve 69 in the hose 76 prevents contaminated water within the hoses 30 and 76 from backflowing to the filtration unit 14.

Figure 2:
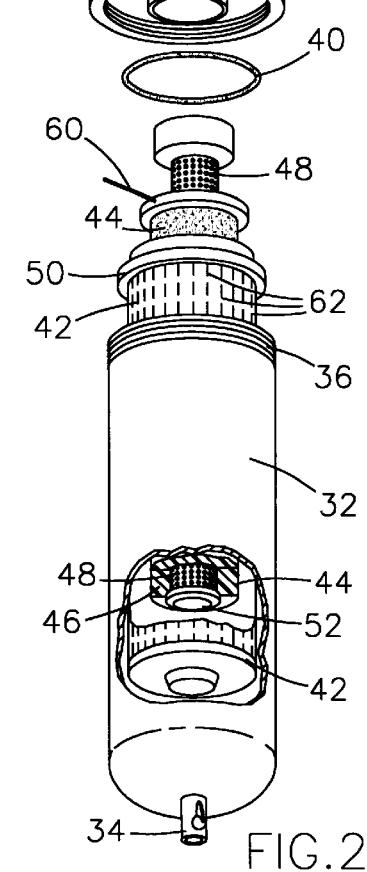
FIG. 2 is an exploded view of the filtration unit of FIG. 1.
Figure 3:
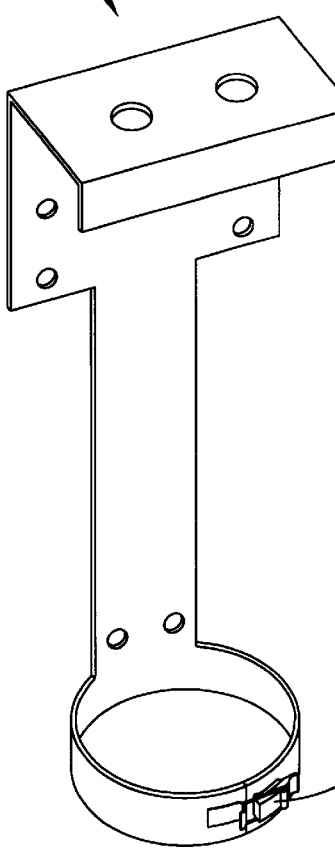
FIG. 3 shows a bracket for mounting the filtration unit of FIGS. 1 and 2.

As shown in FIG. 2, the filtration unit 14 is composed of the vessel 32, which is shown as having a cylindrical shape though it is foreseeable that other shapes could be used. Preferred materials for the vessel 32 include corrosion-resistant metals such as carbon steels and austenitic stainless steels such as Type 304, though it is foreseeable that other metals, plastics and composite materials could be used. The vessel 32 has a lower closed end equipped with a drain port 34, and an upper open end 36 to which the fixed head mounting 38 is secured. The head mounting 38 is adapted to be held in place on the open end 36 of the vessel 32 with threads, though it is foreseeable that other attachment methods could be used. An O-ring 40 forms a fluid-tight seal between the head mounting 38 and the vessel 32.

Contained within the vessel 32 are a basket 42, a filter media bag 44 containing filtration media 46, and a fill tube 48. The basket 42, preferably made of a stainless steel or other corrosion-resistant material such as a plastic or composite, is perforated or otherwise provided with numerous openings 62 that enable bilge water 22 and liquid contaminants to pass through its walls. The upper end of the basket 42 has an annular shoulder 50 that fluidically seals against an inner wall of the vessel 32. The media bag 44 (alternatively, an optional prepackaged media bag 144 shown in FIG. 4) is water-permeable and preferably formed from a fabric having micrometer-sized pores. As with the basket 42, the fill tube 48 is perforated to enable the bilge water 22 to pass through its walls. Importantly, the size and distribution of the fill tube perforations cause the contaminated bilge water to be evenly distributed along the entire length of the media bag 44. As shown, the media bag 44 is enclosed within the basket 42, with its upper end fluidically sealed against the adjacent upper end of the basket 42. Finally, the fill tube 48 extends down through the bag 44 and, as shown in FIG. 2, the lower end of the bag 44 is secured to the lower end of the fill tube 48 with an end cap 52, though another sealed interface arrangement could be employed. As such, the media bag 44, filtration media 46 and fill tube 48 are adapted to be provided as a prepackaged unit. Because the perforations of the fill tube 48 serve to introduce the bilge water 22 more uniformly to the filtration media 46, the self-contained unit formed by the media bag 44, filtration media 46 and fill tube 48 ensures that the fill tube 48 will be centrally located within the filtration media 46 and the bag 44, and avoids the requirement for in-field installation of the fill tube 48 in the bag 44 and media 46.

As is apparent from FIGS. 1 and 2, bilge water 22 pumped from the bilge 24 enters the filtration unit 14 from the hose 28 via an inlet port 54 formed on the vessel 32. Once within the vessel 32, the bilge water 22 is directed downward through the fill tube 48, then passes through the perforations in the fill tube 48 and enters the filtration media 46. As will be explained in greater detail below, the filtration media 46 acts to bond petroleum-based liquids entrained in the bilge water 22, such that the bilge water 22 leaving the filtration media 46 and media bag 44 is essentially free of contaminants. Finally, the bilge water 22 passes through the perforations in the walls of the basket 42, and exits the filtration unit 14 through an outlet 56 near the upper end of the unit 14. As shown, an optional pressure gauge 58 may be mounted on the head mounting 38 in order to sense pressure upstream of the filtration media 46 as an indication of the degree to which the filtration media 46 is congested with contaminants, and therefore indicative of when to replace the media bag 44 and its contents.

Suitable materials for the filtration media 46 include granular compositions that cause petroleum-based liquids, such as oils, fuels, solvents and paints, to gel on contact. A preferred aspect of the filtration media 46 is the ability to bond liquid contaminants with little increase in volume so as to avoid adversely affecting the operation of the filtration unit 14 and avoid structural damage to the unit 14 and its internal components. Preferred filtration media 46 also resist absorption of water in order to promote flow-through of the bilge water 22. Generally, granular materials can be sized to remain within the media bag 44, thereby enabling the filtration media 46 and bag 44 to be handled, installed and removed as a unit. FIG. 2 illustrates the basket 42 as being equipped with a handle 60 to facilitate simultaneous removal of the basket 42, media bag 44 and filtration media 46. As such, replacement of the filtration media 46 is uncomplicated, and used media 46 can be appropriately disposed of, such as at a waste-to-energy disposal facility.

Figure 4:
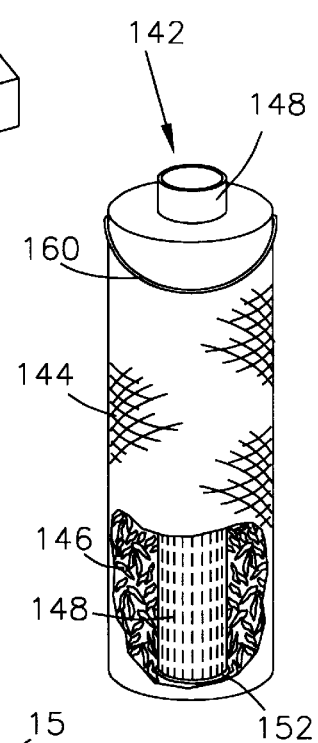
FIG. 4 shows a partially-sectioned prepackaged filter cartridge in accordance with a second embodiment of this invention.

FIG. 4 represents a more detailed view of an optional prepackaged filter 142 which can be substituted for the basket 42, media bag 44 and fill tube 48 shown in FIG. 2. The filter 142 is shown as being composed of a cylindrically-shaped media bag 144 prefilled with a filtration media 146 and equipped with an integral fill tube 148 and handle 160. The media bag 144 is preferably made of a plastic or composite material and is sized to be received within the vessel 32 of the filtration unit 14 shown in FIGS. 1 through 2. The media bag 144 is water-permeable and preferably formed from a fabric having micrometer-sized pores. As with the fill tube 48 shown in FIG. 2, the fill tube 148 is perforated to enable bilge water to pass through its walls, such that the contaminated bilge water will distribute itself evenly throughout the media bag 144. The fill tube 148 extends down through the media bag 144 and, as shown, the lower end of the bag 144 is secured to the lower end of the fill tube 148, and then bonded to a base 152 to prevent leakage of contaminated bilge water from the filter 142.

According to this embodiment of the invention, the prepackaged filter 142 can be manufactured to ensure that the fill tube 148 is centrally located within the filtration media 146, and therefore avoids the requirement for in-field installation of the fill tube 142 in the bag 144 and media 146. As such, the entire filter 142, including the fill tube 142 and media 146, can be removed from the vessel 32 with the handle 160, and then transported to a suitable reclamation facility.

As shown in FIG. 4, a preferred filtration media 146 is a shredded or rolled polypropylene that has been chemically-treated to render it a more effective filtration product. Suitable media materials are available through several sources, such as Eagle Products of Evansville, Ind. With the filtration system 12 of this invention, shredded or rolled polypropylene is a highly effective filtration media and, when saturated, does not get heavy like granular composition material due to a reduced tendency to absorb water. In addition, shredded or rolled polypropylene has a reduced tendency to back flush toward the intake port 54 or discharge outlet 56 of the filtration unit 14. Finally, polypropylene can be readily installed in the media bag 144 during manufacturing by pressure shredding or rolling the material into the bag 144, in accordance with techniques known to those skilled in the art.

Various tests were conducted with two types of filtration media 46, water containing various contaminants commonly found in bilge water, and different numbers of filtration units 14. Each test was performed using a twelve-volt marine bilge pump rated at about twenty gallons per minute (about seventy-five liters/minute), but operated at about fifteen gallons per minute (about sixty liters/minute). The filtration units 14 were each generally as shown in FIG. 2, employing a media bag 44 having average pore sizes of about fifty, one hundred or two hundred micrometers, a vessel 32 having a length of about twenty inches (about fifty centimeters), and a one-inch (about 2.5 centimeters) diameter fill tube 48 having a length of about nineteen inches (about forty-eight centimeters). Waste materials included used 30W motor oil, automatic transmission fluid, and a two-cycle gasoline-oil fuel mixture, dissolved at specified quantities in thirty gallons (about 114 liters) of water. Finally, the filtration media 46 was either a filtration media commercially-available from E.T. Ventures, or a filtration media commercially-available from Environmental Control Technologies, under the name NOCHAR. Individual test conditions were as follows.

| Test Number | Number of Vessels | Filter Bag Pore Size | Filtration Media Type/Quantity | Contaminant(s) Type/Quantity |
|---|---|---|---|---|
| 1 | 1 | 100 μm | 2.5 liters/ETV | OIL/0.24 liters |
| 2 | 1 | 100 μm | 2.5 liters/ETV | ATF 0.24 liters |
| 3 | 2 | 200 μm | 1.4 liters/ECT | OIL 0.7 liters |
|   |   | 50 μm | 0.7 liters/ETV | ATF 0.7 liters |
| 4 | 1 | 50 μm | 2.8 liters/ETV | OIL 0.7 liters |
|   |   |   |   | ATF 0.7 liters |
|   |   |   |   | MIX 0.24 liters |

ETV = Filtration media obtained from E.T. Ventures
ECT = Filtration media obtained from Environmental Control Technologies
OIL = Used 30W motor oil
ATF = Automatic transmission fluid
MIX = Two-cycle gasoline-oil fuel mixture All four tests were characterized by nearly constant flow rates through the filtration units 14, with minimal pressure rise upstream of the filtration media 46. The results from Tests #1 and #2 were that contamination was not visible in the water that had passed through the filtration units. The measurable contamination level in the filtered water was about 146 milligrams per liter. Test #4 also resulted in the filtered water being visibly free contaminants, but required the addition of a surfactant composition available from Star Brite under the name Star Brite Bilge Cleaner, as a flocculation agent for gasoline, which otherwise was found to wash through the filtration media 46. The measurable contamination level in the Test #4 filtered water was less than 2 milligrams per liter. Finally, the results of Test #3 indicated that a slight trace of contaminant residue remained in the filtered water. Subsequent testing under similar conditions and similarly-contaminated water indicated that the shredded or rolled polypropylene media described above in reference to FIG. 4 was still more effective than the media tested above.

From the above, it is apparent that a significant advantage of this invention is that the bilge water filtration system 12 is able to promote the objects of clean water regulations in attaining and maintaining cleaner bodies of water, and can be implemented without interfering or complicating existing bilge water pumping systems employed on boats. Another important aspect of the invention is the modular construction of the filtration unit 14, which enables spent filtration media 46 to be easily and cleanly removed from the unit 14, and enables new media 46 or 146 to be quickly inserted. Finally, the above test results indicate that a very high level of filtration can be attained, even at the relatively high flow levels conventionally desired for bilge pumping systems on boats.

While the invention has been described in terms of a preferred embodiment, it is apparent that other forms are possible. For example, different filter sizes could be adopted by one skilled in the art to accommodate different bilge pump flow rates. In addition, the filtration system could be mounted on a portable cart for use throughout a marina. Furthermore, different grades of filtration media could be developed for handling different types of waste products, or to further adopt the filtration system or media for either destruction or recycling, e.g., a "waste-to-energy" program.

What is claimed is:

1. A bilge water filtration system comprising:
    a filtration unit comprising a head mounting and a vessel supported from and removably secured to the head mounting;
    a water-permeable basket within the vessel;
    a water-permeable filter media bag disposed in the basket;
    filtration media contained in the filter media bag;
    a water-permeable fill tube disposed in the filter media bag and surrounded by the filtration media;
    an inlet line coupled to the head mounting and fluidically connected to the fill tube; an outlet line coupled to the head mounting; and
    a drainage line fluidically connected to the vessel.

2. A bilge water filtration system as recited in claim 1, wherein the filter media bag is formed of a fabric having pores of up to about one hundred micrometers in size.

3. A bilge water filtration system as recited in claim 1, wherein the fill tube has perforations whose size and distribution cause water entering the fill tube to be evenly distributed along the entire length of the filter media bag.

4. A bilge water filtration system as recited in claim 1, wherein the filter media bag, filtration media and fill tube constitute a prepackaged unit.

5. A bilge water filtration system as recited in claim 1, wherein the filtration media is a composition that causes petroleum-based liquids to gel on contact.

6. A bilge water filtration system as recited in claim 1, wherein the filtration media resists absorption of water.

7. A bilge water filtration system as recited in claim 1, wherein the filtration media is selected from the group consisting of granular, shredded and rolled material.

8. A bilge water filtration system as recited in claim 1, further comprising a bilge pump fluidically connected to the inlet line and for pumping bilge water to the fill tube.

9. A bilge water filtration system as recited in claim 8, further comprising means for selectively causing the bilge water to bypass the filtration unit.

10. A bilge water filtration system as recited in claim 9, further comprising means for sensing the presence of oil in the bilge water, the sensing means communicating with the bypass means.

11. A bilge water filtration system installed on a marine vessel, the bilge water filtration system comprising:
    a filtration unit comprising a head mounting and a filter vessel, the head mounting constructed and arranged for being fastened to the marine vessel and having an inlet port and an outlet port, the filter vessel having an open end and a closed end, the open end of the filter vessel being threadably mounted to the head mounting to form a fluid-tight seal therewith;
    a water-permeable basket within the filter vessel;
    a water-permeable filter media bag disposed in the basket, the filter media bag having a first end adjacent the open end of the filter vessel and a second end adjacent the closed end of the filter vessel;
    a water-permeable fill tube disposed in the filter media bag, the fill tube having an open end fluidically connected to the inlet port of the head mounting and a closed end fluidically sealed with the second end of the filter media bag;
    filtration media contained between the filter media bag and the fill tube, the filtration media being shredded or rolled polypropylene;
    an inlet line fluidically connected to the inlet port of the head mounting;

an outlet line fluidically connected to the outlet port of the head mounting and to a through-hull fitting of the marine vessel;

a valve fluidically connected to the inlet line; and a bypass line fluidically connected to the valve and the outlet line so as to allow selective bypassing of the filtration unit.

12. A bilge water filtration system as recited in claim 11, wherein the filter media bag is formed of a fabric having pores of between fifty and two hundred micrometers in size.

13. A bilge water filtration system as recited in claim 11, wherein the fill tube has perforations whose size and distribution cause water entering the fill tube to be evenly distributed along the entire length of the filter media bag.

14. A bilge water filtration system as recited in claim 11, wherein the filter media bag, filtration media and fill tube constitute a prepackaged unit, the fill tube being attached to opposite ends of the filter media bag, the fill tube and filter media bag being secured together at one of the ends of the filter media bag to prevent leakage therebetween.

15. A bilge water filtration system as recited in claim 11, wherein the filtration media comprises a flocculation agent.

16. A bilge water filtration system as recited in claim 11, further comprising a bilge pump fluidically connected to the valve, the bulge pump being capable of pumping the bilge water at a rate of up to seventy-five liters per minute.

17. A bilge water filtration system as recited in claim 11, further comprising means for sensing the presence of oil in the bilge water, the sensing means communicating with the valve.

18. A method of filtering bilge water that is pumped from a bilge of a marine vessel and discharged from a through-hull fitting of the marine vessel, the method comprising the steps of:

providing a bilge water filtration system comprising:

a filtration unit comprising a head mounting and a filter vessel, the head mounting being fastened to the marine vessel and having an inlet port and an outlet port, the filter vessel having an open end and a closed end, the open end of the filter vessel being threadably mounted to the head mounting to form a fluid-tight seal therewith;

a water-permeable basket within the filter vessel;

a water-permeable filter media bag disposed in the basket, the filter media bag having a first end adjacent the open end of the filter vessel and a second end adjacent the closed end of the filter vessel;

a water-permeable fill tube disposed in the filter media bag, the fill tube having an open end fluidically connected to the inlet port of the head mounting and a closed end fluidically sealed with the second end of the filter media bag;

filtration media contained between the filter media bag and the fill tube, the filtration media being shredded or rolled polypropylene;

an inlet line fluidically connected to the inlet port of the head mounting;

an outlet line fluidically connected to the outlet port of the head mounting and to a through-hull fitting of the marine vessel;

a valve fluidically connected to the inlet line; and a bypass line fluidically connected to the valve and the outlet line so as to allow selective bypassing of the filtration unit;

operating the filtration system such that, when oil, gasoline, diesel fuel or another petroleum-based material is not present in the bilge water, the bilge water is pumped from the bilge of the marine vessel through the valve and then through the through-hull fitting of the marine vessel;

and when oil, gasoline, diesel fuel or another petroleum-based material is present in the bilge water, the bilge water is pumped from the bilge of the marine vessel through the valve and then through the filtration unit at a rate of up to seventy-five liters per minute, the bilge water entering the filtration unit through the inlet port of the head mounting, flowing into the fill tube and then into the filtration media where contaminants are removed from the bilge water, flowing from the filtration media through the filter media bag and through the basket into the filter vessel, flowing from the filter vessel through the outlet port of the head mounting to the outlet line, and then discharging through the through-hull fitting of the marine vessel; and subsequently simultaneously removing the basket, filter media bag, fill tube and filtration media from the bilge water filtration system by unthreading the filter vessel from the head mounting.

19. A method as recited in claim 18, wherein the filtration media comprises a flocculation agent.

* * * * *